United States Patent
Hendrichs et al.

(10) Patent No.: US 6,587,502 B1
(45) Date of Patent: Jul. 1, 2003

(54) SYSTEM AND METHOD FOR PROFILE SELECTION DURING FAST RETRAIN OF A WIDEBAND MODEM

(75) Inventors: Laurent Hendrichs, Long Branch, NJ (US); Hubert de Lassus, Highlands, NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 0 days.

(21) Appl. No.: 09/470,798

(22) Filed: Dec. 23, 1999

Related U.S. Application Data
(60) Provisional application No. 60/113,921, filed on Dec. 28, 1998.

(51) Int. Cl.[7] .............................. H04L 5/16; H04L 27/04
(52) U.S. Cl. ...................................... 375/222; 375/295
(58) Field of Search ................................ 375/231, 222, 375/260, 242; 370/468–485; 455/557

(56) References Cited

U.S. PATENT DOCUMENTS

| | | | | | |
|---|---|---|---|---|---|
| 5,515,387 | A | * | 5/1996 | Smith .......................... | 714/752 |
| 5,903,602 | A | * | 5/1999 | Torkkel ........................ | 375/222 |
| 6,038,294 | A | * | 3/2000 | Tran et al. ................ | 379/93.07 |
| 6,233,275 | B1 | * | 5/2001 | Townshend .................. | 375/231 |
| 6,345,071 | B1 | * | 2/2002 | Hamdi ......................... | 375/222 |
| 6,430,219 | B1 | * | 8/2002 | Zuranski et al. ............ | 375/231 |

* cited by examiner

Primary Examiner—Stephen Chin
Assistant Examiner—Lawrence Williams
(74) Attorney, Agent, or Firm—Thomas, Kayden, Horstemeyer & Risley

(57) ABSTRACT

The present invention is directed to a system and method that efficiently, accurately, and quickly detects a suitable stored fast retrain profile to permit the resumption of ADSL communications in the presence of changing line conditions in a dual POTS/ADSL communications system. The method of the present invention is based on measuring the amplitude and phase of a few discrete multi-tone tones in the receiver portion of a communications system and recording the number of times a profile is selected to replace a preceding profile. Broadly, the system and method of the present invention are realized by a digital signal processor that is configured to detect a fast retrain request, select a suitable stored profile, and apply the parameters associated with the selected profile to configure the customer premises modem.

19 Claims, 6 Drawing Sheets

SYSTEM AND METHOD FOR PROFILE SELECTION DURING FAST RETRAIN OF A WIDEBAND MODEM

CROSS-REFERENCE TO RELATED APPLICATION

The present application claims the benefit of U.S. provisional patent application, Serial No. 60/113,921, filed Dec. 28, 1998, which is hereby incorporated by reference in its entirety.

BACKGROUND OF THE INVENTION

1. Field of the Invention

The present invention generally relates to communication systems, and more particularly, to a system and method for profile selection during fast retrain of digital subscriber line modems operating in communication systems using the discrete multi-tone standard.

2. Discussion of the Related Art

In recent years, telephone communication systems have expanded from traditional plain old telephone system (POTS) communications to include high-speed data communications as well. As is known, POTS communications include the transmission of voice information, control signals, public switched telephone network (PSTN) information, as well as, information from ancillary equipment in analog form (i.e. computer modems and facsimile machines) that is transmitted in the POTS bandwidth.

Prompted largely by the desire of large businesses to reliably transfer information over a broadband network, telecommunications service providers have employed discrete multi-tone, hereinafter DMT, systems to provide a plethora of interactive multi-media digital signals over the same existing POTS twisted-pair lines. The provision of asynchronous digital subscriber lines (ADSL) using DMT systems to customer premises has proliferated over recent years. Since ADSL signals are transmitted in a higher frequency band than that of the POTS frequency band, transmitting signals from both the POTS and ADSL frequency bands over the same twisted-pair telephone line (even at the same time), generally is not a problem. Specifically, the POTS frequency band is generally defined from 0 Hz to 4 kHz, while ADSL frequency bands are generally defined by a lower cutoff frequency of approximately 26 kHz, and an upper cutoff frequency of approximately 1 MHz.

In the past, a combination of circuits termed hybrids, and POTS splitters have served to buffer ADSL equipment from distortions and interference introduced in the ADSL frequency bands from the lower frequency POTS equipment. In a DMT-G.Lite standard configuration, the POTS splitter is no longer present. As a result, POTS equipment operates on the same twisted-pair phone line that is being used to deliver ADSL services. POTS equipment operating in this configuration is subject to interference from low frequency harmonics generated within the ADSL equipment.

Conversely, and of greater significance, the presence of abrupt changes in line conditions due to ringing, customer premises noise, POTS handset pick-up, and on/off-hook transitions from ancillary equipment, can disrupt ADSL transmissions. Splitterless operation of an ADSL communication system often incurs a significant and abrupt insertion-loss change upon the off-hook terminating impedance change of the POTS device. As a result, there is a need for a fast recovery mechanism to cope with POTS transients in the ADSL splitterless DMT communication system. DMT systems, by nature of their distribution across multiple frequency bands, are capable of retuning devices to optimize data transfer for changing line conditions. DMT devices selectively transfer bits from the data stream in those discrete frequency bands that are uncorrupted from amplitude modulation radio interference and unaffected by phone system bridge taps, thereby tuning, or maximizing performance under changing line conditions.

Tuning of DMT system parameters is currently performed in two distinct ways:

initial training, hereinafter called "full retrain," and bit loading/swapping, an online optimization procedure. Another often suggested means to retune a system is a fast retrain of the connection. A full retrain of the system connection results in a temporary loss of service and is undesirable under most conditions. Of the methods used to tune DMT parameters, fast retrain is best suited to overcome transient effects, while bit loading/swapping is more adapted to slowly varying changes. The fast retrain method is more robust than bit loading/swapping and provides for a more optimized system since it can actively readapt other system components such as equalizers and echo-cancelers to the system noise environment.

The fast retrain algorithm is triggered when either the central office or the remote transmission unit sense the need to transition from the current parameter profile to a more appropriate previously stored parameter profile. The most typical situation that triggers a fast retrain is when a POTS device goes on/off hook. These transitions create impedance transients that adversely affect the ADSL frequency spectra.

In telephony, an off-hook condition exists when an operational telephone instrument is in use, i.e., during dialing or communicating. "Off-hook" originated from the description of the above condition when the handset was removed from the switchhook which connected the handset to the line when the switch was not depressed from the weight of the handset. Today, "off-hook" pertains to the operating state of a communications link wherein data transmission is enabled for voice, data communications, or network signaling.

On/Off-hook transitions have various effects on transmitted signals. Some of these effects are time dependent, others are time independent. In a first approximation, the following phenomena can be distinguished: attenuation of the received signal, phase of the received signal, time dependency of the impairments, increase in the noise level, and a DC surge.

Fast retrain procedures are usually based upon stored profiles. It is assumed that previous full initialization procedures have been successfully completed upon earlier off-hook and on-hook transitions of POTS equipment at the customer premises. If the full initialization profile under such conditions has been stored in memory, a fast retrain can take advantage of that previous work by identifying current line conditions, recognizing if a suitable profile exists in memory, and simply recalling and applying the stored profile parameters.

Accordingly, it is desired to provide a system and method that efficiently, accurately, and quickly detects a suitable stored fast retrain profile to permit the resumption of ADSL communications in the presence of changing line conditions in a dual POTS/ADSL communications system.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the objects and advantages of the present invention, the present invention is directed to a system and a method for the detection and application of a suitable stored fast retrain profile for a broadband modem using the DMT communication standard. When a suitable profile is not available or there is insufficient evidence to support the implementation of one of the stored profiles, a full system initialization procedure is triggered, skipping the fast retrain process.

The system and method of the present invention models on/off hook transitions and establishes an array of possible profile states. Given the current profile, the probability of transitioning to any of the stored fast retrain profiles is calculated and the results transformed into a probability distance between available profiles. Having established a distance relationship modeling the probability of selecting an appropriate profile, the decision process can be implemented through any of a number of different distance criteria. Once the system has determined a suitable fast retrain profile exists and has selected an appropriate profile, the stored profile parameters are used to configure the modem.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
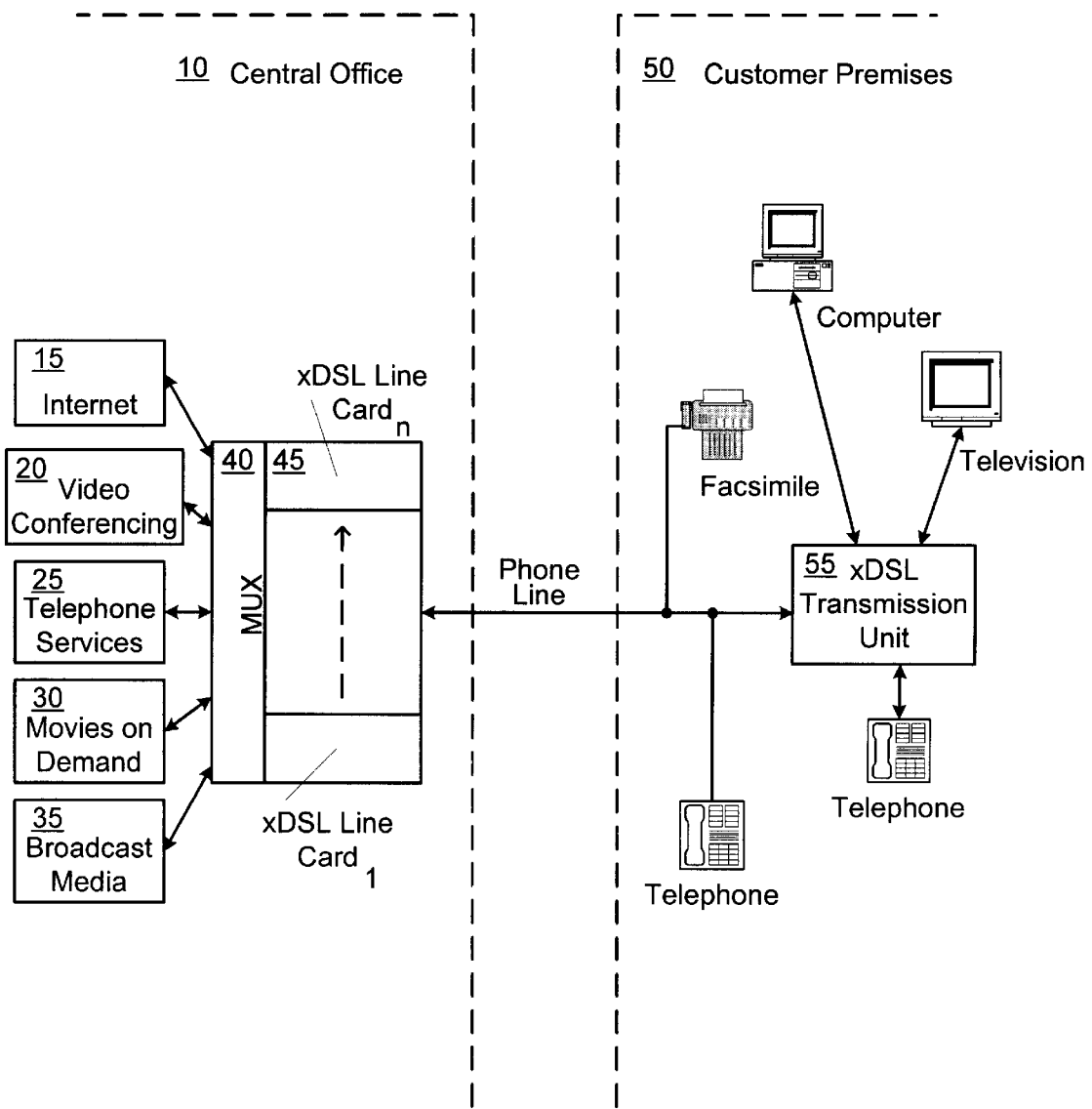
FIG. 1 is a block diagram illustrating the delivery of multiple broadband services via a communications system on a telephone line.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Turning now to the drawings, reference is made to FIG. 1 which illustrates the delivery of broadband communication services via an ADSL over the POTS network. In this regard, a central office 10 is configured to receive broadband services which it assembles via central office ADSL line cards 45 for transmission over a POTS phone line to a customer premises 50. Examples of such broadband services are depicted as Internet 15, video conferencing 20, telephone services 25, movies on demand 30, and broadcast media 35. Central office 10 assembles signals from the aforementioned broadband services via mux 40 for appropriate transformation and transmission by ADSL line cards 45.

Customer premises 50 has a compatible ADSL transmission unit 55, which processes and distributes the several services to appropriate destination devices such as a computer, television, and a telephone as illustrated. It is significant to note that customer premises 50 may have POTS devices such as the facsimile machine and another telephone integrated on the PSTN line along with ADSL transmission unit 55. On/off hook impedance transitions introduced by POTS devices such as the telephone and the facsimile machine illustrated in FIG. 1 can interrupt ADSL communications that must traverse the same PSTN line. It should be understood that the circuitry conventionally implemented in, for example, an ADSL transceiver will be included within ADSL line cards 45 and ADSL transmission unit 55 as shown in FIG. 1. The implementation of such circuitry will be appreciated by persons skilled in the art, and need not be described herein.

Figure 2:
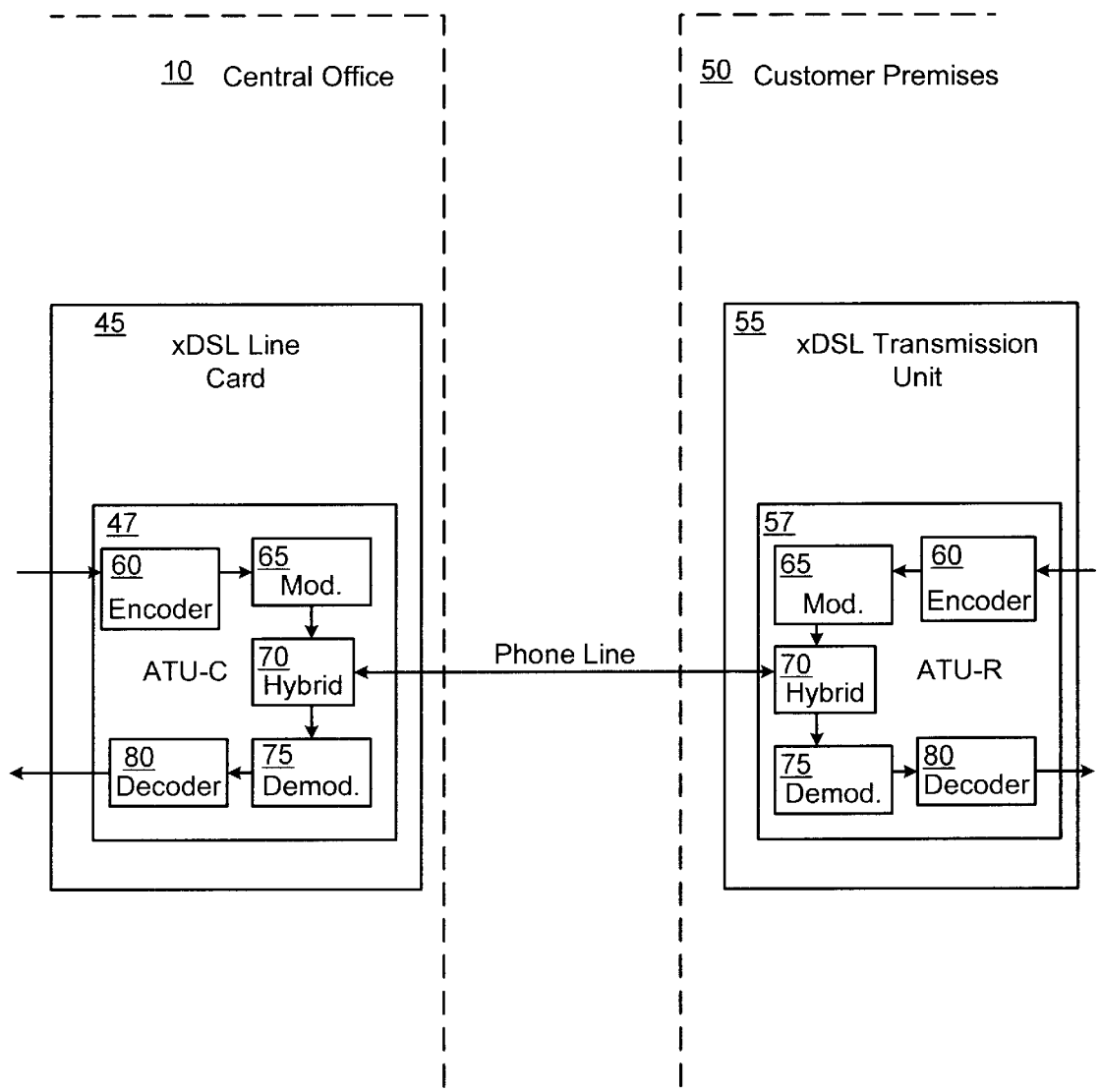
FIG. 2 is a block diagram further illustrating a communications system in accordance with FIG. 1.

Having provided a top level description of a communications system configured to deliver a multitude of broadband services, reference is now made to FIG. 2, which illustrates a portion of an ADSL line card 45 and ADSL transmission unit 55 as shown in FIG. 1. In this regard, ADSL line card 45 contains an ADSL transmission unit—central office, hereinafter ATU-C 47. Similarly, ADSL transmission unit 55 contains an ADSL transmission unit—remote, hereinafter ATU-R 57. Both ATU-C 47 and ATU-R 57 serve to enable two-way communications between ADSL line card 45 and ADSL transmission unit 55 via the PSTN. Since each ATU is similarly configured, the description herein will address the five functional blocks only once. Both ATU-C 47 and ATU-R 57 receive digital data in encoder 60. Encoder 60 processes the digital data and forwards it to modulator 65 which adaptively applies the digital data across the DMT frequencies. Modulator 65 then forwards a multitude of designated spread spectrum frequencies to hybrid 70 for data transmission along the PSTN line. In the manner described above, data is assembled, adaptively applied, and transmitted from one ADSL device to another across each of the separate DMT channels as the physical characteristics of the environment surrounding each individual system allows.

Similarly, hybrid 70 is configured to receive a multitude of spread spectrum frequencies from the remote ADSL transmission unit along the PSTN line. Hybrid 70 forwards designated spread spectrum frequencies to demodulator 75. Demodulator 75 processes the set of spread spectrum frequencies to remove digital data. Demodulator 75 forwards the digital data to decoder 80. Decoder 80 processes the digital data and distributes it to the appropriate broadband device.

In a communications system utilizing DMT, there are a variety of ADSL protocols that serve to coordinate the functions of individual units in the system. One such signal is the two tone signal, C_RECOV. Upon detection of a C_RECOV signal, ATU-R 57 configures itself for a fast retrain.

Fast retrain procedures assume that the communication system has suitable memory, that the system has the capability of implementing a fast retrain procedure, and that the system can implement a recognition device for the stored profiles. More precisely, fast retrain procedures require that off-hook and on-hook conditions have been encountered that have triggered full retrains and that the system has found and stored in memory a set of system parameters that permit successful data transmission under such conditions. Fast retrain procedures further require the system to match the stored parameter sets with the present line situation. That is, the system must have an algorithm that will selectively choose a stored profile that matches the current line situation. If no profile matches the current situation, the system must also be able to trigger a full retrain of the system.

DMT standards currently support the storage of 16 profiles. The profiles contain B & G tables (bins or tones used and the power of each), forward error correction parameters R & S, interleaver depth, D, power spectral density level, and distinctive features that uniquely describe the link state to enable a simplified selection of a link state.

The system and method of the present invention will decide for a known profile once the adaptive gain controller (AGC) is trained. System profiles are identifiable from the phase shift and amplitude change between pseudo-noise (PN) sequence Fourier coefficients stored in memory and the current PN sequence symbol at the output of the AGC. The present invention will decide for an unknown profile if a threshold on the known profile device is exceeded.

Fast Retrain Computation During Full Initialization at Customer Premises

Figure 3:
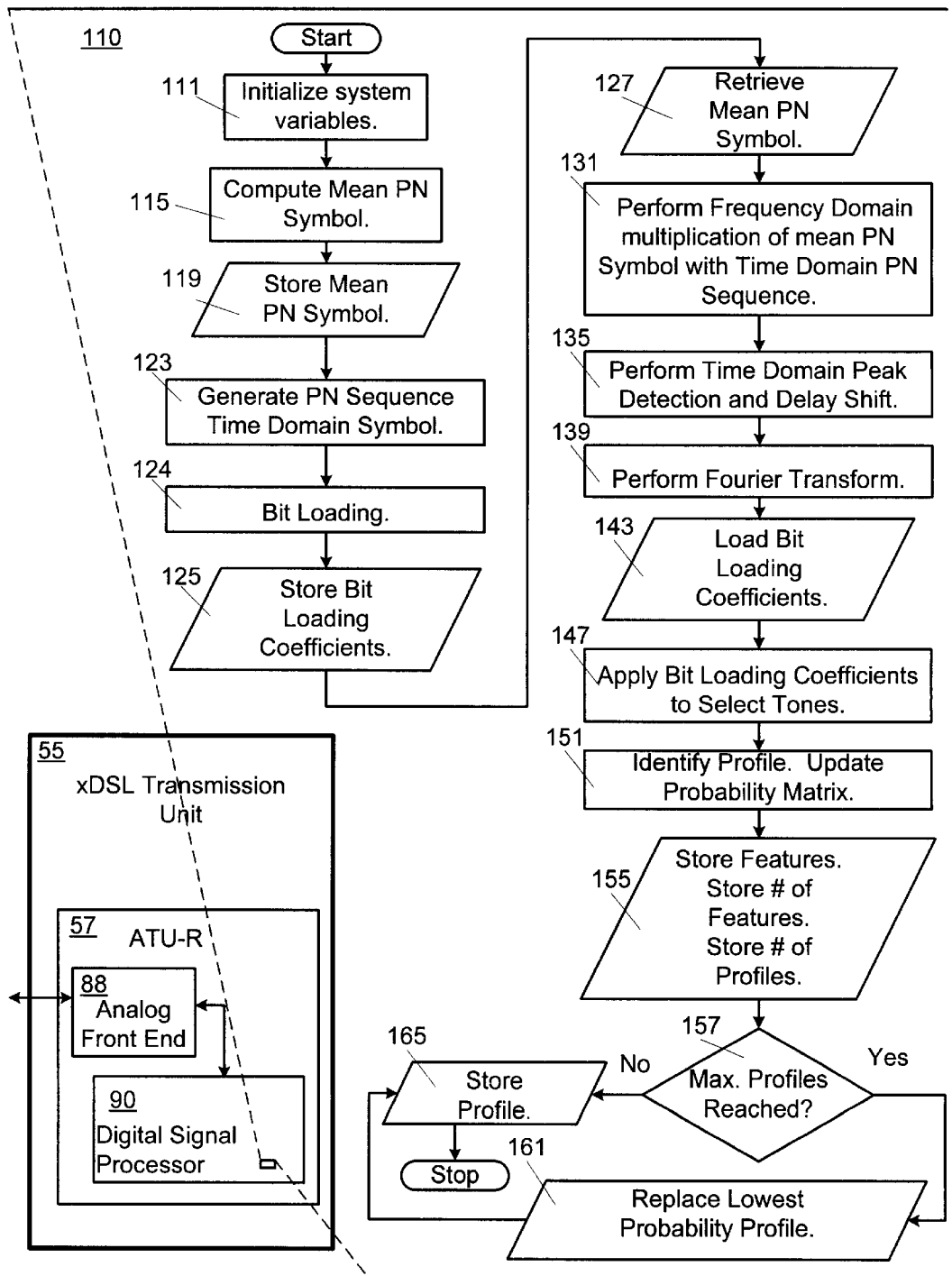
FIG. 3 is a block diagram of a system that illustrates the method steps of a full initialization procedure whereby a system profile is stored.

Reference is now made to FIG. 3, which illustrates a system that performs a full system initialization at customer premises 50 in order to store a system profile. When central office 10 (see FIG. 2) commands a full retrain of the communication system, analog front end 88 and a digital signal processor 90 within ATU-R 57 receive and process the full retrain command. ATU-R 57 is located within xDSL transmission unit 55 which was shown in FIGS. 1 and 2 at customer premises 50. Digital signal processor 90 can be configured to perform any of a number necessary functions in order to coordinate the two-way transmission of broadband data in a DMT system. As illustrated in FIG. 3, the system of the present invention starts method 110 by initializing system variables in step 111. The system computes a mean PN symbol received from ATU-C 47 (see FIG. 2) in step 115. Next, in step 119, the system stores the mean PN symbol computed in the previous step. The system proceeds by generating a PN sequence time domain symbol, X, in step 123. The system continues the full retrain process by performing a bit loading procedure in step 124 whereby ATU-R 57 determines an efficient and effective means of receiving the ADSL data stream across each of the spread spectrum frequencies in the DMT communication system. Depending on line conditions, external interference, and line attenuation over frequency, bits from the ADSL data stream are selected for application across the individual tones. After selecting bit loading coefficients in step 124, the system stores the bit loading coefficients in step 125.

After retrieving the mean PN symbol from memory in step 127, the system performs a frequency domain multiplication of the mean PN symbol with a time domain PN sequence symbol, X, in step 131. The system further aligns the frequency domain symbol in step 135 by performing a time domain peak detection of the delay and a delay shift. Next, the system performs a Fourier transform of the time domain symbol and stores the result in step 139. In step 143, the system loads the bit loading coefficients previously stored in step 125. In step 147, the system applies the bit loading coefficients across select tones to generate an index of the present system features. The system proceeds to create a system profile by applying the Fourier transform result previously stored in step 139 to the index of present system features generated in step 147. Profile generation, identification, and an update of a probability matrix is accomplished in step 151. The system proceeds to store the system features, the number of features, and the number of profiles stored in step 155.

The system then determines if the maximum number of stored profiles has been reached in step 157. If the maximum number of stored profiles has not been reached, the system proceeds to step 165 where the profile is stored. If the maximum number of stored profiles has been reached, the system first selects the stored profile with the lowest probability of occurrence for replacement. Having selected the profile with the lowest probability of occurrence, the system inserts the current profile into memory in step 161. After replacing the lowest probability profile in step 161, the system proceeds to step 165 where the profile is stored.

Having selected a profile, the system applies the profile parameters and verifies the selected profile is suitable for ADSL data transmission before signaling ATU-C 47 (see FIG. 2) that ATU-R 57 has successfully completed the full system initialization and is ready for data transmission mode.

Figure 4:
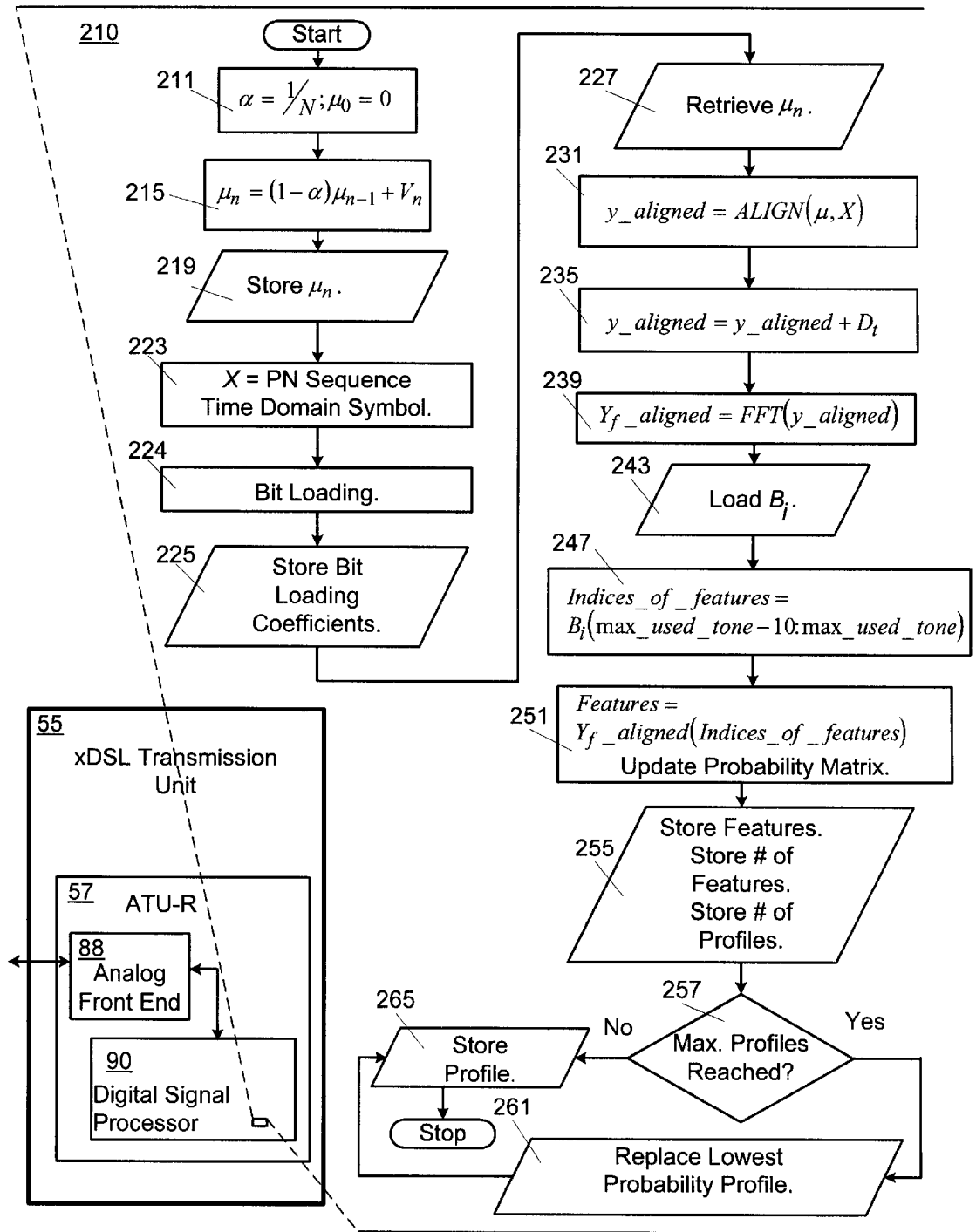
FIG. 4 is a block diagram of a system that further illustrates the method steps of FIG. 3.

Having described the full initialization process at customer premises 50 whereby a system profile is generated and stored at a high level, reference is now made to FIG. 4 which illustrates the full initialization process with further detail. As illustrated in FIG. 4, the system of the present invention starts method 210 by initializing system variables in step 211. While the PN sequence is being sent by central office 10, customer premises 50 averages the received symbols in the time domain. During this time, customer premises 50 is quiet or sending one or more pilot tones. The ADSL standard PN sequence is generated by the following algorithm repeated for illustration:

$d_n=1$ for $n=1,2,\ldots 6$ $d_n=d_{n-5}+e,\text{crc} ++ee\ d_{n-6}$ for $n=7, 8, \ldots, 64$ Bits $d_1$ to $d_6$ are reinitialized for each DMT symbol so that each PN sequence symbol uses the same data. The first pair of bits ($d_1$ and $d_2$) are used for the direct coupled and Nyquist sub-carriers. The power assigned to these bits is zero. The following formula is used to recursively compute a mean received PN symbol in step 215:

$$\mu_n=(1-\alpha)\mu_{n-1}+\alpha V_n, \qquad \text{Eq. 1}$$

where $\alpha=1/N; \mu_0=0$; $n=1, \ldots N$; and $V_n$=received symbol.

The algorithm proceeds as follows: $\mu_n$ is stored in memory in step 219. Before the system transitions into data transfer mode, the system generates a PN sequence time domain symbol, X, in step 223. Next, the system performs bit loading in step 224 and stores the bit loading coefficients in step 225. The system proceeds by recalling $\mu_n$ from memory in step 227. A frequency domain multiplication of $\mu_n$ and X is performed by a function called ALIGN in step 231 and followed by a time domain peak detection of the delay and a delay shift in step 235. Next, the algorithm transforms the result from the time domain to the frequency domain by applying a Fourier transform to y__aligned in step 239.

The system proceeds by loading the $B_i$ table in step 243. Next, in step 247, the system stores only the most descriptive features (selected Fourier coefficients) as follows: Indices_ of_features=$B_i$ table (max_used_tone—10: max_used_ tone). Proceeding to step 251, the system identifies a system profile as follows: Features=$Y_f$_aligned(Indices_of_ features). The system further provides an identifier for the profile and updates a transition probability matrix in step 251. Next, the profile feature values, the number of features, and the number of available profiles are stored in step 255.

Upon a full initialization, if the maximum number of stored profiles is reached a new profile replaces the profile with the smallest probability value (profile least used). This occurs in step 261. If the maximum number of stored profiles is not reached by the system, the profile is stored in step 265.

Profile Selection During Fast Retrain at Customer Premises

Figure 5:
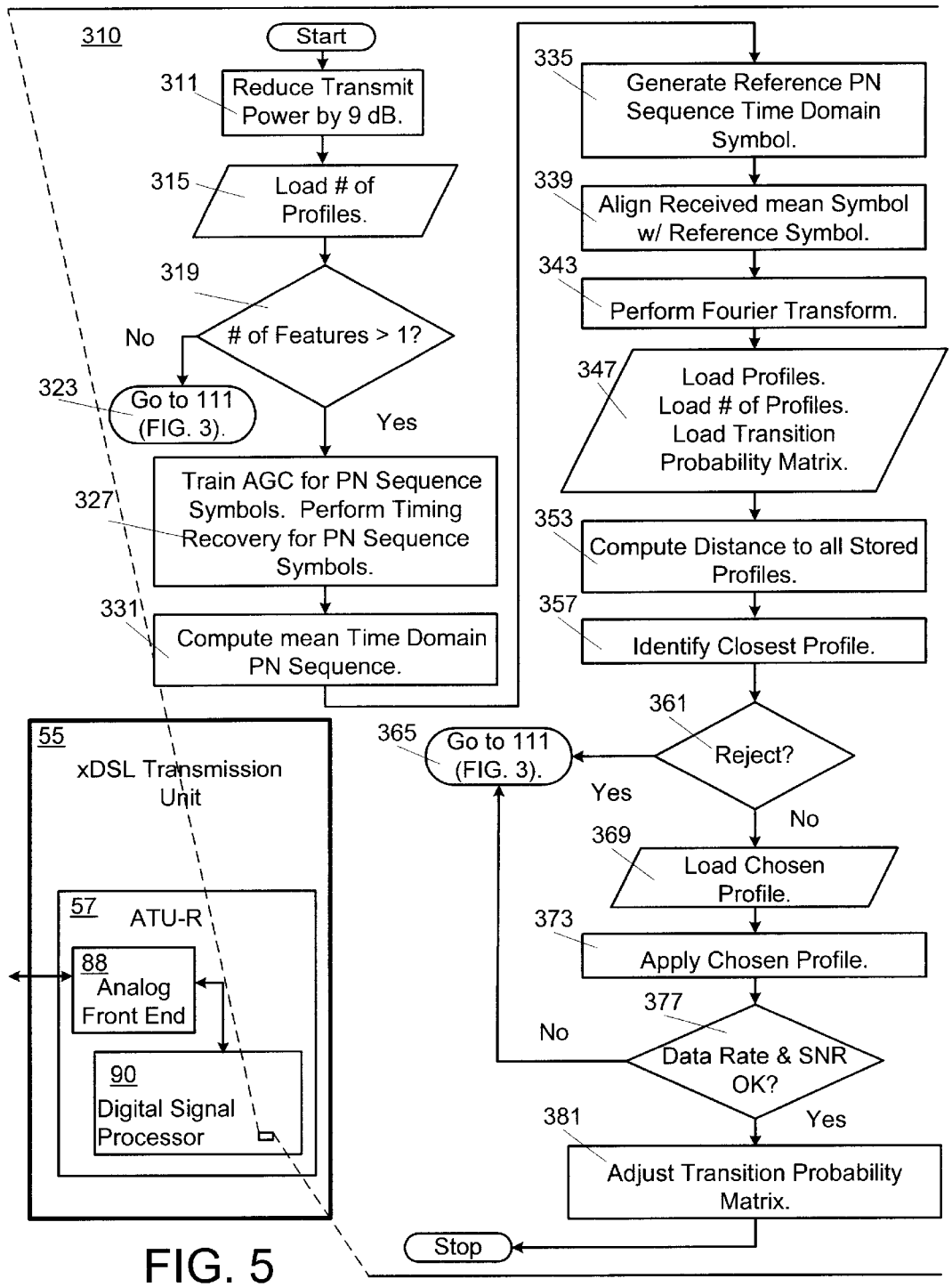
FIG. 5 is a block diagram of a system that illustrates the method steps related to a fast retrain selection of a stored system profile.

Having described a system and method for generating and storing a system profile in FIGS. 3 and 4, reference is now made to FIG. 5, which describes a system that performs a fast retrain at customer premises 50. When either the central office 10 (see FIG. 2) or customer premises 50 senses a problem with the upstream or downstream data links, either portion of the system can request a fast retrain of the communication system. Upon initiating or receiving a request for a fast retrain from the ATU-C 47 (see FIG. 2), analog front end 88 and a digital signal processor 90 within ATU-R 57 receive and process the fast retrain command. ATU-R 57 is located within xDSL transmission unit 55 which was shown in FIGS. 1 and 2 at customer premises 50. Digital signal processor 90, within ATU-R 57, can be configured to perform any of a number necessary functions in order to coordinate the two-way transmission of broadband data in a DMT system. As illustrated in FIG. 5, the system of the present invention starts method 310 by reducing the transmit power at customer premises 50 by 9 dB in step 311. The system loads the number of profiles previously stored in step 315. Next, in step 319, the system determines if the number of features in the stored profiles is greater than 1. If the number of stored features is 1 or less, the system decides for a full initialization and step 323 triggers a full initialization as previously illustrated in FIG. 3. Otherwise, the system proceeds to step 327 where the AGC is trained and timing recovery is performed for a predetermined number of PN sequence symbols.

The system proceeds by generating a reference PN sequence time domain symbol in step 335. In step 339, the system aligns the received mean symbol with the reference PN sequence time domain symbol generated in step 335. Next, the system performs a Fourier transform on the result in step 143. The system loads the stored profiles, the number of stored profiles, and loads the transition probability matrix in step 347. After computing the distance from the present system profile to all stored profiles in step 353, the system identifies the closest profile in step 357.

If the closest profile fails to meet or exceed the reject criteria for selecting a profile in step 361, the system decides for and triggers a full initialization of the system in step 365. Otherwise, the chosen profile is loaded in step 369 and applied to the system in step 373. After application of the selected profile, the system verifies that the data rate and signal to noise ratio (SNR) is acceptable in step 377. If the selected profile fails to meet the acceptance thresholds of step 377, the system triggers a full initialization in step 365. If the applied profile results in acceptable system data rate and SNR, the transition probability matrix is updated in step 381.

Having selected, applied, and verified a profile, the system signals ATU-C 47 (see FIG. 2) that ATU-R 57 has successfully completed the fast retrain of the system and is ready for data transmission mode.

Figure 6:
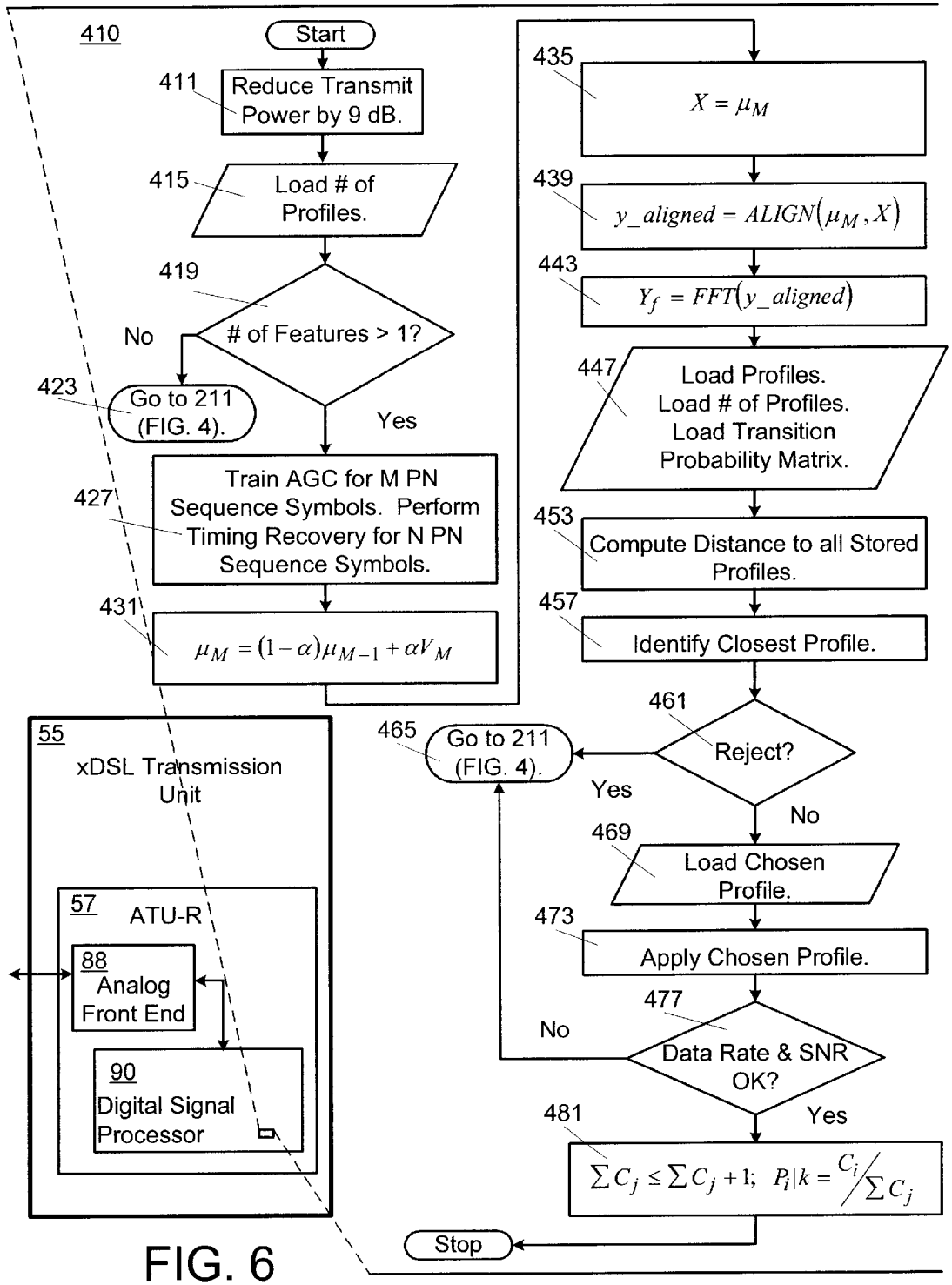
FIG. 6 is a block diagram of a system that further illustrates the method steps of FIG. 5.

The following steps illustrated in FIG. 6 further detail the method of profile selection during a fast retrain procedure at customer premises 50 as illustrated in FIG. 5. Upon an event that triggers a fast retrain, fast retrain method 410 is initiated and in step 411, customer premises transmit power is reduced by 9 dB. The method, loads the number of available pre-stored profiles from memory in step 415. The fast retrain procedure checks the quantity of features stored with the profile in step 419. If the number of features in the stored profile is greater than 1, the method decides for a fast retrain. Otherwise, the method decides for a full initialization in step 423.

If fast retrain is selected, the method performs step 427 where the AGC is trained for MPN sequence symbols, and timing recovery for N PN sequence symbols is performed. In step 431, the method averages the received symbols in the time domain. The method then proceeds to generate X, a PN sequence time domain symbol of size and sampling equal to $\mu_n$, in step 435. Next, in step 439, the method aligns the received average symbol to the reference symbol. ALIGN computes the crosscorrelation function in the frequency domain. The maximum value of the time domain crosscorrelation function yields the delay. Then ALIGN shifts the mean symbol by the delay time.

The algorithm of the present method then transitions to the frequency domain by computing $Y_f$_aligned=FFT(y_ aligned) in step 443. Next, in step 447, the method compares features from the mean received symbol to features from the profiles pre-stored in memory using prior probabilities stored in the transition matrix. The method proceeds to compute the distance to all stored profiles in step 453 and proceed to profile selection according to predefined rules and priors in step 457.

At this point, the method performs a threshold verification of the distance from the previous system profile and the selected profile. If the distance exceeds a predetermined threshold in step 461, the method decides for a full initialization of the system and proceeds to step 465 where the method triggers the full initialization process illustrated in FIG. 4. If the distance between the previous profile and the selected profile is less than the threshold of step 465, the method loads the chosen profile in step 469 and applies the chosen profile to the system in step 473.

The system is configured in step 473 as follows, the method loads and trains the time domain equalizer (TEQ), echo canceler (EC), and frequency domain equalizer (FEQ) using the chosen profile as an initial state. The method performs bit loading across the spread spectrum frequencies with the chosen profile. Next, the method adjusts the power level with the chosen profile and sets the Interleaver depth.

After configuring the system with the selected profile parameters as per the steps above, the method evaluates the data rate and SNR of the system using the updated profile in step 477. If acceptable, the method adjusts prior probabilities in the transition probability matrix in step 481. If the recorded data rate and SNR of the system are not acceptable, the method proceeds to step 465 where the method triggers a full initialization of the system. After successful completion of the method illustrated in FIG. 6, ATU-R 57 signals ATU-C 47 to enter data transfer mode.

Bayes' Theorem

To improve the recognition process, a Bayesian approach is used. Bayes theorem provides a means for incorporating new data with given probability information. This is useful for combining experimental, survey, and judgment data. The Bayesian approach provides the means and encouragement for improving probability estimates by implicitly recognizing the variability of the probability estimates themselves. Accurate estimates of parameters require large amounts of data. Errors of estimation are unavoidable. In the classic approach, confidence intervals are used to express the degree of expected errors. When observed data are limited, in order to obtain an acceptable confidence level, statistical estimates have to be supplemented or superseded by judgmental information.

Given that an event that may have been the result of any two or more causes has occurred, a question arises as to the probability that the event was the result of a particular cause. Inverse probability addresses the question. The fundamental theorem of inverse probability is Bayes' Theorem, which is given below for a discrete case:

$$p\langle A_j | B\rangle = \frac{p\langle B | A_j\rangle p\langle A_j\rangle}{\sum_j p\langle B | A_j\rangle p\langle A_j\rangle}. \qquad \text{Eq. 2}$$

The formula illustrates that given that an event B has occurred, the probability that it was due to cause $A_j$ is equal to the probability that $A_j$ should produce the event times the probability that $A_j$ should occur in the first place, divided by a scaling factor that is equal to the sum of all such terms for all js.

The special situation where all $A_j$ are equally likely is found by setting all $p(A_j)$ equal to each other. Then $p(A_j)$ factors out of the denominator and cancels the term in the numerator, and the result is the formula without $p(A_j)$ terms.

The system and method of the present invention will take advantage of prior knowledge of telecommunications systems to reduce the probability of choosing an incorrect profile. Using this approach, further improvements can be made as knowledge of the system becomes available. With three independent facts $A_1$, $A_2$, and $A_3$, the probability of all three occurring is as follows:

$$p\langle A_1 A_2 A_3\rangle = p\langle A_3 | A_1 A_2\rangle p\langle A_2 | A_1\rangle p\langle A_1\rangle. \qquad \text{Eq. 3}$$

Modeling On/Off Hook Transition Probabilities

Considering four devices on a telephone line, 16 states can be labeled by four digits (one for each device). When a device is "on," the digit for that device is set to 1; when a device is "off," the digit representing the device is 0. Four devices that are "off" will be modeled by 0000, while if all four devices are "on," the line state is modeled by 1111. For purposes of the present invention, it is assumed that it is nearly impossible for any two of the four devices to go "on/off" hook at the same time. Further, it is assumed that the probability of future transitions towards "on" or "off" is directly related to the previous transition. That is, a device that is "off hook" will most likely transition to "on hook" and vice-versa. The system and method of the present invention also assume that the more devices are off hook, the worse will be the quality of transmission. When these conditions exist, the end user will be aware of the degradation related to operating more than one piece of equipment simultaneously on the line and therefore will gravitate towards use of only one device whenever possible. As a result, 0s are more probable than 1s in the model. Furthermore, starting from any configuration of four digits, it is not possible to reach in one step any other configuration of four digits. This would mean that two or more devices had gone on/off hook simultaneously. For example, it is not possible to transition from 1111 to 0011. If all transitions are not to be considered, this means some transitions will never occur in the model.

Given these assumptions, it is clear that the probability of transitioning from state 1111 to state 1011, is not equal to the probability of transitioning from 1011 to 1111. Indeed, the time a device stays idle is not correlated with the time it runs, as a device may stay idle for a long time and run for only a short time. These assumptions enable a model of the on/off hook phenomenon with Bayes' formula.

The system and method of the present invention assumes that all information needed to decide for a specific profile is included in a received PN sequence frequency domain symbol. The system keeps track of the preceding profile and computes the probability of reaching a subsequent profile among the stored possible profiles. If k is the current profile; k−1 is the previous profile; and v is the current PN sequence frequency domain symbol, we know from Bayes' Theorem that the probability is given as follows:

$$p<v,k,k-1> = p<v|(k,k-1)> p<k|k-1> p<k-1>. \qquad \text{Eq. 4}$$

The three separate probabilities on the right side of Equation 4 can be simplified as explained below. P(v|k,k−1) is modeling the dispersion of the received PN sequence symbol around its prototype. This probability is independent of the previous profile, k−1, and relies only upon the current profile, k. So this factor can be simplified as follows:

$$P<v|k,k-1> = P<v|k>. \qquad \text{Eq. 5}$$

Assuming a Gaussian distribution of each specific Fourier coefficient of the received PN sequence, P<v|k> can be modeled as:

$$N(v, \mu, K) = \frac{1}{\sqrt{(2\pi)^N \det K}} \exp\left(-\frac{1}{2}(v-\mu)^T K^{-1}(v-\mu)\right). \qquad \text{Eq. 6}$$

Where $\mu$ is the mean and K the covariance of a specific Fourier coefficient of the received PN sequence. Since we are interested not in the true probability, only in the making of a decision, we will transform the true probability solution into a generalized distance in the Bayesian space. Monotonic mapping will not change the order in the generalized distance space, so multiplying by a scalar or mapping with a log function will not affect the decision process. Since, P<k−1>, the probability of the previous profile, is the same for all current profiles, it is possible to just eliminate it from the decision process, yielding:

$$d_k(v) = \frac{1}{\sqrt{(2\pi)^N \det K}} \exp\left(-\frac{1}{2}(v-\mu)^T K^{-1}(v-\mu)\right) P\langle k | k-1\rangle, \qquad \text{Eq. 7}$$

Multiplying Equation 7 by $\sqrt{(2\pi)^N}$ will not affect the decision and further simplifies Equation 7.

$$d_k(v) = \frac{1}{\sqrt{\det K}} \exp\left(-\frac{1}{2}(v-\mu)^T K^{-1}(v-\mu)\right) P\langle k | k-1\rangle, \qquad \text{Eq. 8}$$

Mapping Equation 7 with a monotonic function also will not affect the decision.

$$d_k(v) = \log\left(\frac{P\langle k|k-1\rangle}{\sqrt{\det K}}\right) - \frac{1}{2}(v-\mu)^T K^{-1}(v-\mu) \qquad \text{Eq. 9}$$

$$k = 1, 2, \ldots, N$$

If $Prior_k =$ $$\log\left(\frac{P\langle k|k-1\rangle}{\sqrt{\det K_k}}\right) \text{ and } likelihood_k = Q_k = \frac{1}{2}(v-\mu_k)^T K_k^{-1}(v-\mu_k),$$

where k=1, 2, . . . , N.
We have, $$d_k(v) = Prior_k - likelihood_k \qquad \text{Eq. 10}$$

The decision is then made by using a maximum distance classifier as follows:

if $d_k(v) = \text{Max}_k d(v)$ and $d_k(v) > \beta$, Decide for $k$: otherwise reject.  Eq. 11

This distance is comprised of two terms. The first term does not depend on v, the current signal, and therefore may be computed once, for all k at initialization. The numerator of the first term P<k|k−1> is a prior, while detK is a noise term. An estimator for the prior is used.

When the necessity for fast retrain is detected, the modem will have the choice between a certain number of profiles available in memory. The current standard sets this number of stored profiles at 16. In order for the fast retrain algorithm to minimize the probability of error when choosing a new profile, data can be stored that will help the modem determine the most likely transitions from the current state.

The objective is to guess probabilities of transition from profile $S_i$ to profile $S_j$ from the total number of $N_{ij}$ of such transitions and the total number $N_i$ of transitions from profile $S_i$ to all other recognized profiles. A basic approach would suggest an estimator of the probability $P_{ij}$ of transition from profile $S_i$ to profile $S_j$:

$$\hat{P}_{ij} = \frac{N_{ij}}{\sum_{j=1}^{N_p} N_{ij}} = \frac{N_{ij}}{N_i}. \qquad \text{Eq. 12}$$

However, implementation of this formula is limited in practice as it provides a zero transition probability to transitions that have never occurred. Those transitions would never be selected by the present invention if they were given a zero probability of transition.

If $S_i$ and $S_j$ are recognized profiles, if a transition from profile $S_i$ to profile $S_j$ has never been recorded, and if $N_i$ is the total number of transitions with parent state $S_i$, then the probability of transition from profile $S_i$ to profile $S_j$ is:

$$P_{ij} = \frac{1}{2} N_i. \qquad \text{Eq. 13}$$

If a rigorous approach is required, the calculation of a confidence interval for $\hat{P}_{ij}$, the estimator of $P_{ij}$, can be easily accomplished. It suffices to use the center of the interval as an estimate of the probability of an event that has never occurred. Thus, what is needed is a simple and effective estimator for $P_{ij}$.

Information concerning transition probabilities can be stored in various ways. The system and method of the present invention uses a counter matrix where element $N_{ij}$ represents the total number of transitions between state i and state j. In order to set the estimator at the center of the interval, $N_{ij}$ are set to ¼ for all transitions that have never been recorded. At all times, the transition counter matrix is a square sub-matrix of a 16×16 array. All elements of the array, that are not in the transition counter matrix are set to 0.

When the first state is encountered, the 1,1 element is set to 0.5. That is, $N_{11}=½$. When a new profile is detected, if $S_p$ is the parent profile, and NP is the new number of available profiles, a $NP^{th}$ row and a $NP^{th}$ column are added to the matrix. All values in the new row and column are set to 0.25, except element $N_p$,NP, that is set to 1.

$$N_{ij}=0.5 i=NP, 1<j<NP N_{ij}=0.5 j=NP, 1<j<NP, j\neq pN_p, NP=1$$

$$N = \begin{pmatrix} N_{11} & N_{12} & N_{13} & 1 & 0 & 0 & 0 & 0 & 0 & 0 & 0 & 0 & 0 & 0 & 0 & 0 \\ N_{21} & N_{22} & N_{23} & 0.5 & 0 & 0 & 0 & 0 & 0 & 0 & 0 & 0 & 0 & 0 & 0 & 0 \\ N_{31} & N_{32} & N_{33} & 0.5 & 0 & 0 & 0 & 0 & 0 & 0 & 0 & 0 & 0 & 0 & 0 & 0 \\ 0.5 & 0.5 & 0.5 & 0.5 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \end{pmatrix}$$

When recording a transition from profile $S_p$ to profile $S_c$, the $N_p$, c coefficient should be update as follows:

$$N_{pc} = N_{pc} + 1. \qquad \text{Eq. 14}$$

From the counter matrix, estimators of the transition probabilities can readily be calculated:

$$P_{ij} = \frac{N_{ij}}{\sum_{j=1}^{NP} N_{ij}}, \qquad \text{Eq. 15}$$

where NP is the number of available profiles at the time of the fast retrain. This formula implies the computation of 1/denominator, This could be computed once per fast retrain by a coordinate Rotational Digital Computer (CORDIC) algorithm (one cycle per bit precision). Thus, this computation is unnecessary as it is just a normalizing factor that does not change the order.

Upon encountering an overflow, the entire matrix is divided by 2. As described thus far, the learning algorithm suffers from one drawback. As time passes, probabilities in the matrix will increase, making it extremely difficult for a new configuration to emerge, that is, obtain a very high probability of occurrence. This drawback will limit the model for customers who replace or add POTS equipment. The problem will be acute for customers who add a frequently used POTS device.

A solution to the learning problem described above is to store transition information in a first in first out (FIFO) buffer. The FIFO would allow a system with limited memory as it would only store the latest transitions. Storing each transition requires 8 bits. As a result, a system with a memory of 2 months requiring 20 fast retrains a day will require 1,200 bytes of storage. If 1,200 bytes of memory or more is available, the following steps should be introduced:

(i,j)=read(FIFO)
write( FIFO,(p,c))
$N_{pc}=N_{pc}+1$
$N_{ij}=N_{ij}-1$

Recalling that the decision function of the present invention is a maximum distance classifier, there are many different ways to implement a rejection process for this type of classifier. For example, the decision process can be decided based on: a maximum criterion; a difference criterion; a radius criterion; and a nearest neighbor criterion.

A maximum criterion implements the Bayes' Theorem as follows:

$$\text{Max}_k d(v) = \beta.  \quad \text{Eq. 16}$$

The minimum effective threshold is 1/K where K is the number of classes. It is important to note that if the minimum of the components of $d_k(v)$ are checked, the device will be more robust against unknown profiles.

A Difference criterion can be implemented as follows:

$$\text{Max}_k d(v) - \text{secondMax}_k d(v) < \beta, \quad \text{Eq. 17}$$

once again, if the components of $d_k(v)$ are checked, the device will be more robust against unknown profiles.

A radius criterion can be implemented as follows:

$$r_{min}^2 > \beta, \quad \text{Eq. 18}$$

where $r^2$ is the minimum among the squared distances between d(v) and the prototype vectors.

There are two alternative methods to compute the distance under a nearest neighbor criterion. The first uses the vector of the Fourier coefficients. The second makes a decision on each Fourier coefficient one at a time. In the first case, $\mu$ is a vector and K is a matrix. In the second case, $\mu$ and K are scalars.

In the scalar case, the decision function D(i) is computed for each p Fourier coefficient in the feature vector F of Fourier Coefficients of dimension P (p=1, 2, . . . , P). Typically, P=10. The class with the maximum weighted distance D(i) for this Fourier coefficient is stacked in a result vector R of dimension P.

$$D_i = \text{Max}_k \left( -\frac{1}{2} \log(\text{var}(prototype_k)) - \frac{1}{2} d_{ij} + \log(P_{ij}) \right) \quad \text{Eq. 19}$$

$j = 1, \ldots, 16$ $$R = \sum_{i=1}^{P} D_i. \quad \text{Eq. 20}$$

The result vector, R, yields a series of decisions that may be contradictory. To assess this result vector, a rejection device is suggested. In the vector case, only one decision is suggested. In order to have more than one decision suggested, which provides a more robust device, the PN symbol sequence can be split into more than one independent data set and a generalized distance from each data set can be computed. The results can then be placed in a resultant vector, R, of dimension, P (P= number of independent data sets). The class most represented in the resultant vector represents the profile that will be loaded. For ten Fourier coefficients, the class vector stacking could look like the following:

| 3 | 3 | 2 | 3 | 3 | 4 | 1 | 3 | 2 | 3 |
|---|---|---|---|---|---|---|---|---|---|

On this particular vector, class 3 occurs six times. Class 3 would be the winning class and the associated profile would be loaded into the system. If the most represented class occurs less than half of the times in the vector, the decision is a reject (see step 461 in FIG. 6), and a full system initialization is triggered. This would be the case in the example above if class 3 occurred only 4 times in the 10 slot vector, and if no other class occurred with a greater frequency than class 3.

In this regard, the embodiment or embodiments discussed herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A digital signal processor for performing profile selection during a fast retrain of a wide band modem in a discrete multi-tone (DMT) communication system comprising:
   means to store system profiles following successful system initializations;
   means to generate, identify, and store a current system profile;
   means to record the number of times a previously stored system profile is successfully selected to replace the current profile to create a transition probability matrix;
   means to generate and store a temporary system profile;
   means for comparing and selecting the previously stored system profile with the highest probability of resulting in a successful fast retrain;
   means for applying the selected previously stored system profile to the system; and
   means to adjust the transition probability matrix;
   wherein the means to generate, identify, and store a current system profile is accomplished by an average received pseudo-noise symbol.

2. The digital signal processor of claim 1, wherein the average received pseudo-noise symbol is computed for a select subset of the downstream signal tones.

3. The digital signal processor of claim 1, wherein the average received pseudo-noise symbol is computed for a predetermined number of samples.

4. The digital signal processor of claim 1, wherein the current system profile is identified by Fourier coefficients.

5. The digital signal processor of claim 4, wherein the current system profile is identified by a select subset of the Fourier coefficients.

6. The digital signal processor of claim 5, wherein the means to selectively reject the selected system profile with the highest probability of success is accomplished by creating a result vector, the result vector consisting of the results from a decision function applied to each Fourier coefficient in the selected system profile.

7. The digital signal processor of claim 6, wherein a decision to reject the selected system profile is determined by selecting a class with the highest frequency in the result vector and determining if the selected class occurs more than a predetermined number of times in the result vector.

8. A digital subscriber line transmission unit using the discrete multi-tone communication standard configured to adaptively select and apply a system profile during a fast retrain comprising:

an analog front end, said analog front end operative to receive a multicarrier input signal and transmit a multicarrier output signal for communication to a remote digital subscriber line transmission unit through the public switched telephone network;

a memory device operative to store a transition probability matrix and a multiplicity of system profiles; and a digital signal processor, said digital signal processor operative to perform a full system initialization, store the resulting system profile in the memory device following successful system initializations, and update the transition probability matrix, said digital signal processor responsive to a request to perform a fast retrain of the transmission unit, wherein the fast retrain consists of identifying a current system profile, selecting a previously stored system profile with the highest probability of successfully configuring the transmission unit given the current system profile, applying the selected system profile and updating the transition probability matrix;

wherein the digital signal processor generates, identifies, and stores a current system profile by averaging a received pseudo-noise symbol.

9. The digital subscriber line transmission unit of claim 8, wherein the received pseudo-noise symbol is computed for a select subset of downstream signal tones.

10. The digital subscriber line transmission unit of claim 8, wherein the received pseudo-noise symbol is computed for a predetermined number of samples.

11. The digital subscriber line transmission unit of claim 8, wherein the current system profile is identified by Fourier coefficients.

12. The digital subscriber line transmission unit of claim 11, wherein the digital signal processor is configured to selectively reject the selected system profile with the highest probability of success by creating a result vector, the result vector consisting of results from a decision function applied to each Fourier coefficient in the selected system profile.

13. The digital subscriber line transmission unit of claim 12, wherein the digital signal processor rejects the selected system profile by selecting a class with the highest frequency in the result vector and determining if the selected class occurs more than a predetermined number of times in the result vector.

14. A method for adaptively selecting and applying a system profile during a fast retrain of a digital subscriber line transmission unit using the discrete multi-tone communications standard comprising:

storing system profiles following successful system initializations;

generating, identifying, and storing a current system profile;

recording the number of times a previously stored system profile is successfully selected to replace the current profile to create a transition probability matrix;

generating and storing a temporary system profile;

comparing and selecting the previously stored system profile with the highest probability of resulting in a successful fast retrain;

applying the selected previously stored system profile to the system; and adjusting the transition probability matrix;

wherein the step of generating, identifying, and storing a current system profile is accomplished by an average received pseudo-noise symbol.

15. The method of claim 14, wherein the average received pseudo-noise symbol is computed for a select subset of the downstream signal tones.

16. The method of claim 14, wherein the average received pseudo-noise symbol is computed for a predetermined number of samples.

17. The method of claim 14, wherein the current system profile is identified by Fourier coefficients.

18. The method of claim 17, wherein selectively rejecting the selected system profile with the highest probability of success is accomplished by creating a result vector, the result vector consisting of the results from a decision function applied to each Fourier coefficient in the selected system profile.

19. The method of claim 18, wherein a decision to reject the selected system profile is determined by selecting a class with the highest frequency in the result vector and determining if the selected class occurs more than a predetermined number of times in the result vector.

* * * * *